April 7, 1931.  A. C. HAMILTON  1,799,461
MOTOR VEHICLE
Filed May 25, 1926  3 Sheets-Sheet 1
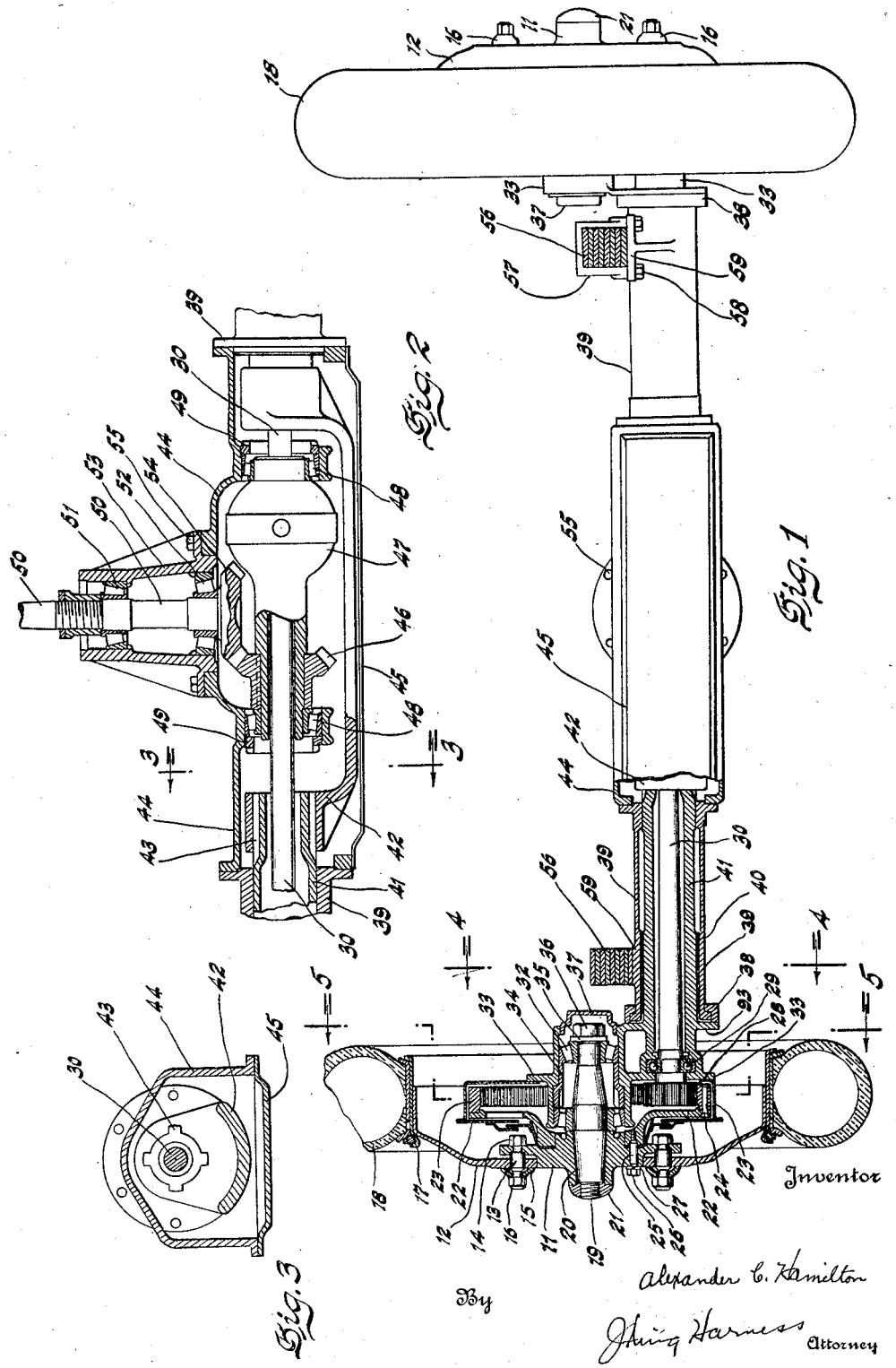
Inventor
Alexander C. Hamilton
By
Jhing Harness
Attorney

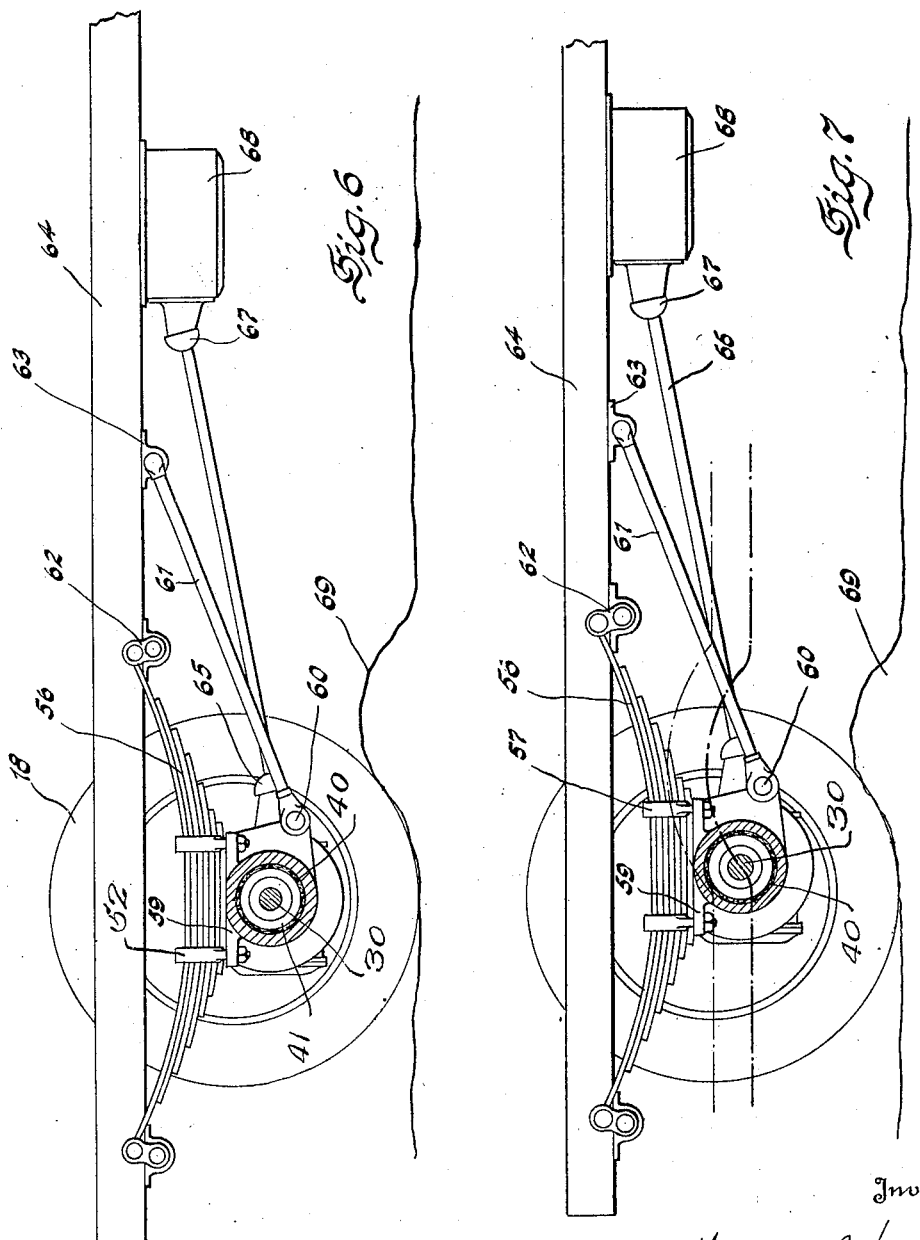

Patented Apr. 7, 1931

1,799,461

UNITED STATES PATENT OFFICE

ALEXANDER C. HAMILTON, OF DETROIT, MICHIGAN, ASSIGNOR, BY MESNE ASSIGNMENTS, TO RELAY MOTOR PRODUCTS CORPORATION, OF BRIDGEPORT, CONNECTICUT, A CORPORATION OF DELAWARE

MOTOR VEHICLE

Application filed May 25, 1926. Serial No. 111,477.

My invention relates to improvements in driving mechanism for motor vehicles wherein the weight of the vehicle together with its load may be utilized to assist the forward and rearward rotation of the driving wheels in addition to the torque delivered to the driving wheels from the source of motive power.

My invention more specifically deals with mounting the load carrying axle around the axle drive shafts, which are eccentric of and below the road wheel centers, thus eliminating a center load carrying axle, and inverting the usual wheel construction by securing spindles in the driving wheel hubs and supporting such spindles in antifriction bearings carried by a housing that is integral with the eccentrically disposed load carrying axle which in turn surrounds the axle drive shaft. This elimination of the center axle permits me to mount the load carrying leaf springs on a separate housing that surrounds and is rotatable upon the load carrying axle which in turn surrounds the axle drive shaft, thereby affording space between the wheels for body and frame clearance and permitting a much lower chassis platform, which is of great advantage as it directly lowers the center of gravity particularly in bus construction where a floor quite close to the ground is very much to be desired.

In my invention, I have provided for all clearances necessary to permit each element to perform its particular function, and at the same time have adequately housed all working elements to retain lubrication and prevent the entrance of dust and water.

With the above and other objects in view, my invention consists in the arrangement, combination and construction of the various elements of my improved device as described in the specification, claimed in my claims and shown in the accompanying drawings, in which:

Fig. 1 is a rear elevation, partly in section, of the entire axle construction including wheels and tires.

Fig. 2 is a horizontal section of the center portion of the axle construction looking downwards, and slightly enlarged.

Fig. 3 is a section taken on line 3—3 of Fig. 2.

Fig. 6 is a side elevation of the rear portion of the vehicle chassis with the near wheel removed and the housing partly cut away to disclose the relative location of the axle elements when in their normal position.

Fig. 7 is a side elevation of the rear portion of the vehicle chassis with the near wheel removed and the housing partly cut away to disclose the relative location of the axle elements when an obstacle is encountered and the wheel momentarily stops.

Figure 4:
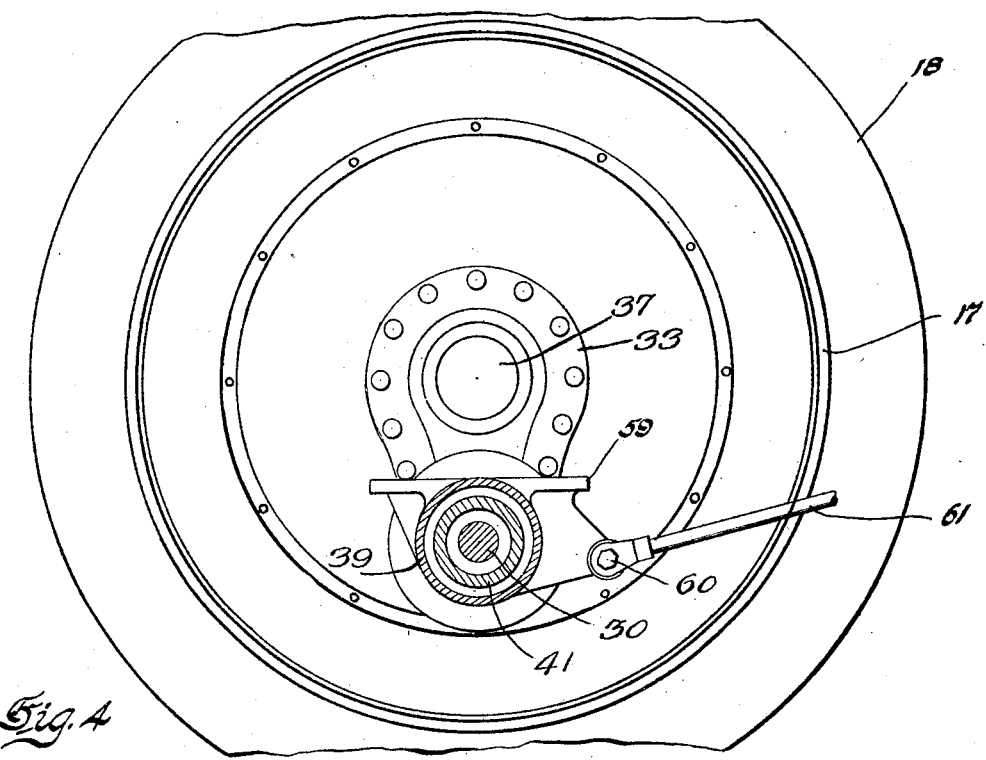
Fig. 4 is a section taken on line 4—4 of Fig. 1.
Figure 5:
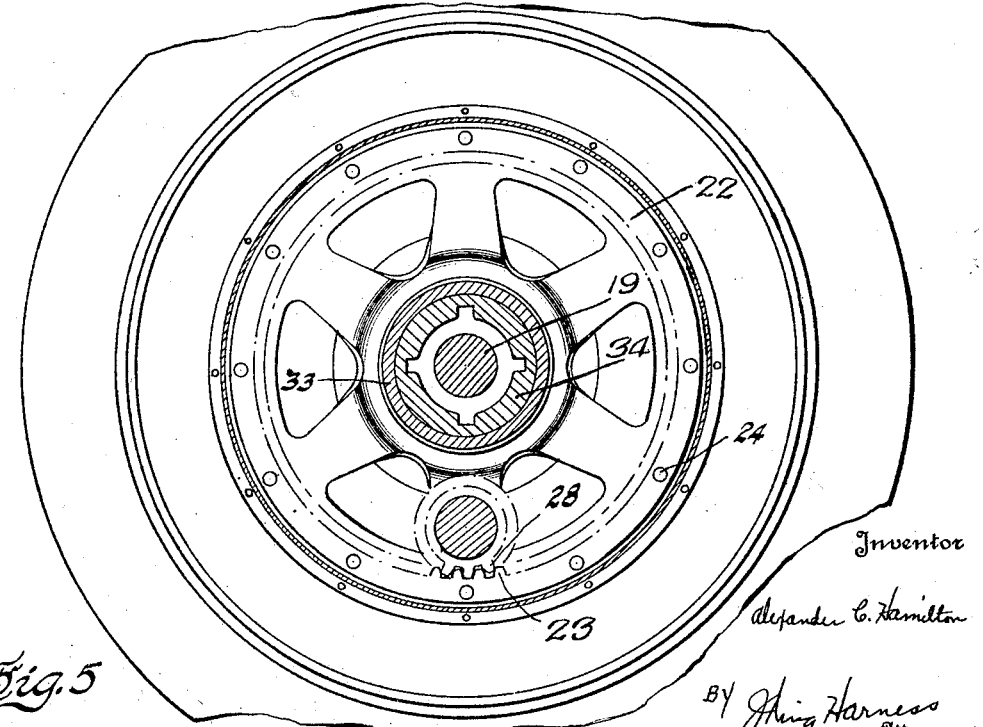
Fig. 5 is a section taken on line 5—5 of Fig. 1.

In the drawings, 11 is the driving wheel hub, to which is attached the wheel body 12 by means of the studs 13, nuts 14, washers 15 and nuts 16. On the wheel body 12 is mounted the tire rim 17 which carries the tire 18. This combination permits the removal of the wheel body 12, rim 17 and tire 18 as a unit without disturbing the hub 11, by merely removing the nuts 16 and washers 15. The spindle 19 is secured in the hub 11 by drawing up on the taper 20 by means of the nut 21 threaded on the end of the spindle 19. The spider 22 is rigidly attached to the hub 11 by studs 25, nuts 26 and lock washers 27. The internal gear ring 23 is attached to the spider 22 by a series of rivets 24. This permits the gear ring 23 to be made of forged steel or any metal different from that of the spider 22, besides making replacement of the gear ring 23 possible without replacing the balance of the structure. On the spindle 19 are mounted antifriction bearings 31 and 32 which are mounted in the housing 33 and held in spaced relation by the sleeve 34. The bearings 31 and 32 are adjusted with relation to each other by means of the nut 36 and the collar 35. The opening through which adjusting nut 36 is operated is closed by the cap 37 which screws into the case 33. In the lower portion of the case 33 is mounted the external gear pinion 28 which correctly meshes with the internal gear ring 23. The gear 28 is rigidly attached to the outer end of the drive shaft 30, which in turn is supported in the case 33 on the antifriction bearing 29. Surrounding the shaft 30 is the tubular housing 41 which extends inwardly toward the center of the axle and passes into the casing 44 where it is rigidly fastened to the arch member 42 by a series of splines 43. A duplicate housing 41 from the opposite side of the axle passes into the housing 44 and is similarly attached to the arch member 42 on the opposite side of the center of the axle. The fastening together of the two housings 41 by the arch member 42 combines them to form a rigid load supporting unit, independent of the drive shafts 30.

Surrounding the housings 41 are a pair of casings 39, both firmly attached to a central housing 44, which are free to rotate on the housings 41, the bushings 40 borne by the casings 39 being free to rotate on a finished portion of the housing 41. The bushings 40 are located directly under the spring seats 59 which are integral with the casings 39, and as the leaf springs 56 are rigidly attached to the spring seats 59 by means of the spring clips 57 and nuts 58, it follows that all load on the springs 56 will be transferred through the casings 39 and bushings 40 to the casings 41, which as described above, are integral with the housings 33 which in turn carry the bearings 31 and 32. Thus, the load originally placed on the springs 56 is transferred through the various elements given above, until it is imposed on the spindles 19 and thence through the hubs 11, wheel bodies 12, rims 17 and tires 18 to the ground.

The housing 44 to which the two housings 39 are rigidly attached has an opening at the front to which the carrier 53 is bolted by means of the bolts 55. In this carrier 53 are mounted the antifriction bearings 51 and 52 carrying the pinion shaft 50, which in this instance, has integral with it the driving bevel pinion 54. Bevel pinion 54 on the end of the drive shaft 50 meshes with and drives the bevel gear 46 which is rigidly attached to a conventional differential 47, within which are splined the drive shafts 30. The differential 47 is carried on the antifriction bearings 48 which are mounted in the housing 44. The bearings 48 are adjusted and locked in lateral location by the adjusting rings 49. The arch or bridge member 42 is so shaped that is clears the differential 47, the gear 46 and the bridges around the bearings 48, and additional clearance is allowed in the housings 44, as shown in Fig. 3, to allow the arch member to rotate in relation to the axis of the shaft 30 for a considerable angle either side of its normal horizontal position. When this rotation takes place, the housing 41 turns freely in the housing 39.

The outer ends of the housings 39 are flanged against a mating flange 93 on the housing 41 and are held in lateral fixed relation by the ring 38 which is bolted against the flange 93 on the housing 41, although the housing 39 is free to rotate within the ring 38.

When the road wheels meet with rotative resistance, and motive power is applied to the shaft 30, the pinion 28 will start to climb up around the inside of the ring gear 23 and carry with it the shaft 30, the housing 41 and the housing 39. The spring 57 fastened to the seat 59 on the housing 39 causes the housing 39 to rotate on its own axis relative to the housing 41, and the relative rotational movement of the housing 39 with respect to the housing 41 causes the arch or bridge member 42 to rotate within the casing 44 where sufficient clearance is present to prevent any interference between the member 42 and anything within the housing 44, except when at the extreme desirable movement, the arch member 42 comes in contact with the inner wall of the housing 44 thus providing a limiting stop. Since both sides of the axle are alike, the climbing motion of one side will be duplicated on the other side. It will be noted that when this climbing motion has taken place, a downward load imposed on the springs, i. e., the weight of the chassis and its load, will by reason of the force of gravity, exert a turning force on the inside of the ring gear 23, tending to urge the wheel forward, and this force will be in addition to the rotative force of the pinion 28 tending to transfer is rotative torque to the ring gear 23. As soon as the resistance is overcome by these added forces, and the housing 41 swings down to its lowermost position, the driving action is then alone effected by the transfer of torque from the pinion 28 to the ring gear 23.

In normal action, the moment a slight additional resistance to the rolling of the wheels occurs, they slow up or momentarily stop, and then the climbing effect takes place to assist the forward motion of the vehicle, very much like the well known tread mill or squirrel cage.

Motive power is transmitted to the drive shafts 30 from the gear case 68, through the universal join 67, propeller shaft 66, and universal joint 65 to the bevel pinion shaft 50 through the bevel pinion 54, to the bevel gear 46, thence through the differential 47 to the shafts 30. The reacting torque of the bevel gears 54 and 46 is transferred through the bearings 51 and 52 to the carrier 53, thence to the housing 44 to the housing 39, spring seats 59, springs 56, shackles 62 to the frame 64. The longitudinal relation of the housing 44 with respect to the frame 64 is maintained by the radius rods 61 which are attached at their forward ends to the frame at the point 63 and to a boss on the spring seat 59 at 60. The forward or rearward driving effect of the axle unit is also imparted to the frame 64 through the radius rods 61, since the springs 56 are shackled at both ends of each spring and are therefore not restrained in a longitudinal direction.

An examination of Figs. 6 and 7 will disclose the relative position of the elements when in a position of rest as shown in Fig. 6, and after the climbing action has occurred as shown in Fig. 7. It will be seen that when an obstacle is encountered and the wheel momentarily stands still, the climbing action previously described takes place and the vehicle chassis is actually moved forward by reason of the loaded springs forcing downward and adding their load to the wheel turning effort. When the extra resistance has been overcome, the structure returns to its original and normal position as shown in Fig. 6.

It should be noted that because the pinion 28 and shafts 30 are mounted below the center of the road wheels, the climbing tendency will be in the correct direction to assist in driving the vehicle either forward or backward with equal facility.

It will now be apparent that I have devised a novel and useful construction in a very simple combination. Obviously changes in detail may be made by one skilled in the art without departing from the theory and spirit of my invention, and I do not care to limit myself to any particular form or arrangement of these elements.

What I claim is:

1. An axle housing, axle shafts journaled in the housing, differential mechanism driving said shafts at their inner ends, a pinion on the outer end of each shaft, a wheel support extended from each end of the axle housing, a spindle in each support, a wheel on each spindle, a gear on each wheel meshing with the pinion on the axle shaft adjacent to it, and a unitary load carrying housing extending between said supports rotatably mounted on said axle housing.

2. A pair of axle shafts, differential mechanism driving the inner ends of the shafts, a drive shaft driving the differential mechanism, an axle shaft housing comprising a pair of tubular ends for enclosing the shafts and a central bridge clearing said differential, wheel supports on the ends of the housing, wheels journaled in the supports, gearing on the wheels and gearing on the shafts connected thereto, another housing enclosing said axle housing and load carrying springs mounted on said second housing.

3. A pair of axle shafts, differential mechanism driving the inner ends of the shafts, a drive shaft driving the differential mechanism, an axle shaft housing comprising a pair of tubular ends for enclosing the shafts and a central bridge clearing said differential, wheel supports on the ends of the housing, wheels journaled in the supports, gearing on the wheels and gearing on the shafts connected thereto, another housing enclosing said axle housing and load carrying springs mounted on said second housing, said housings being rotatable relative to each other.

4. A pair of axle shafts, differential mechanism driving the inner ends of the shafts, a drive shaft driving the differential mechanism, an axle shaft housing comprising a pair of tubular ends for enclosing the shafts and a central bridge clearing said differential, wheel supports on the ends of the housing, wheels journaled in the supports, gearing on the wheels and gearing on the shafts connected thereto, another housing enclosing said axle housings and load carrying springs mounted on said second housing, said housings being rotatable relative to each other, and said bridge on the first housing acting as a stop to prevent such movement beyond a pre-determined point.

5. A pair of axle shafts, a housing for the shafts comprising tubular end portions and a central bridge, wheel supports carried by the housing, wheels on said supports, eccentric to the shafts, means connecting the wheels with the shafts, and a unitary load carrying housing extending between said supports surrounding and rotatably mounted on said axle housing.

6. A pair of axle shafts, a housing for the shafts comprising tubular end portions and a central bridge, wheel supports carried by the housing, wheels on said supports, eccentric to the shafts, means connecting the wheels with the shafts, a load carrying housing surrounding and rotatable relative to said axle housing, and means, comprising the bridge in said first housing for limiting said rotatable movement of said load carrying housing.

7. In an axle mechanism, a pair of aligned driving shafts, a housing surrounding the outer ends of said shafts and rotatably supporting said ends, a second housing surrounding the first mentioned housing and rotatably carried thereby, and a differential mechanism carried by said second housing operatively joining the adjacent ends of said shafts.

8. In an axle mechanism, a pair of aligned axle shafts, a housing surrounding said shafts rotatably supporting the outer ends thereof comprising a pair of aligned tubular portions rigidly connected together by a central bridge, and a second housing surrounding the first mentioned housing rotatable thereon and rotatably supporting the adjacent ends of said shafts.

9. In a motor vehicle provided with a frame, a pair of aligned driving shafts, a housing surrounding said shafts and rotatably supporting the same, wheels rotatably carried by said housing eccentrically of and normally axially above said shafts, internal gears on said wheels, pinions on said shafts in meshing relationship with said gears, load carrying springs secured to said frame, and means for securing said springs to said housings whereby the driving effort transmitted by said pinions to said gears is permitted to lift said housing upward in respect to the axis of said wheels and in the direction of travel of said vehicle without affecting the relative position of said housing in respect to said frame, said means comprising a unitary housing rotatably mounted relative to the first mentioned housing and extending between said springs.

10. In combination with a motor vehicle provided with a chassis frame, an axle mechanism comprising a pair of aligned drive shafts, a housing surrounding said drive shafts supporting the same, a wheel carried by each end of said housing eccentrically of and normally above said shafts and operatively connected thereto for driving movement therefrom, differential mechanism connecting the adjacent ends of said shafts, means for driving said differential mechanism, load carrying springs, and means for supporting the first mentioned means and said springs on said housing whereby said housing and said shafts maybe caused to swing upwardly about the center of said wheels when a forward driving effort is applied therethrough to said wheels without affecting the relative normal positions of said springs and said first mentioned means relative to said chassis frame.

11. In a motor vehicle provided with a frame, an axle mechanism comprising a pair of aligned axle shafts connected together at their adjacent ends by a differential mechanism and provided with pinion gears at the outer ends thereof, a rigid housing surrounding said shafts provided with end supports fixed thereto, a wheel rotatably mounted on each of said supports eccentrically of and normally above said shafts, each of said wheels being provided with an internal gear meshing with the corresponding pinion gear on said shafts, and springs and differential mechanism supported on said housing for movement relative thereto whereby the climbing action of said pinions on said gears in transmitting power thereto is permitted to raise said housing relative to said wheels without affecting the normal relative positions of said springs and said differential mechanism relative to said frame.

12. In a motor vehicle axle, in combination, a pair of relatively rotatable housings one within the other, a wheel carried by the inner of said housings in eccentric relation thereto, an axle rotatably mounted in said inner housing and having driving engagement with said wheel, load carrying springs carried by the outer of said housings, and a propeller shaft supported by said outer housing and having driving engagement with said axle.

13. In a motor vehicle, in combination, a frame, an axle housing extending transversely of said frame, load carrying springs rigidly secured to said axle, means connecting said springs to said frame, a sleeve rotatably received in each end of said axle housing, a wheel support secured to the outer end of each of said sleeves, a wheel carried by each of said supports eccentric to and with its center normally above said sleeves, a differential mechanism supported by said axle housing between said sleeves, an axle shaft rotatably mounted in each of said sleeves and connected at its inner ends to said differential mechanism, a ring gear secured to each of said wheels, and a pinion secured to the outer end of each of said axle shafts in mesh with the corresponding of said ring gears whereby to impart driving movement to said wheels and in imparting such driving movement to urge said axle housing forwardly and upwardly relative to said wheels against the load on said frame.

14. In a motor vehicle, in combination, a frame, a rigid axle housing extending transversely of said frame, load carrying springs connecting said housing to said frame for material movement longitudinally of said vehicle relative to said frame, a sleeve rotatably received by each end of said housing and maintained against relative axial movement with respect thereto, a support secured against relative rotation to each of said sleeves beyond the corresponding ends of said housing, a wheel rotatably mounted on each of said supports with its axis eccentric to and normally above the axis of the corresponding of said sleeves, an internal gear secured concentrically to each of said wheels, a differential mechanism supported by said housing, an axle shaft connected with said differential and extending outwardly thereof through each of said sleeves, a pinion on the outer end of each of said axle shafts in mesh with the corresponding of said internal gears, and means extending through said housing for driving said differential mechanism without restricting material bodily swinging movement of said housing about the axis of said wheels.

ALEXANDER C. HAMILTON.